G. HALL, Jr. & G. W. AVERELL.

SPOOLS FOR THREAD.

No. 7,060. Reissued April 18, 1876.

WITNESSES:

Geo. W. Kenyon

Chas. A. Pettit

INVENTOR:

G. Hall Jr.

G. W. Averell

BY

Kenyon & Kenyon

ATTORNEYS.

N. PETERS, PHOTO-LITHOGRAPHER, WASHINGTON, D. C

UNITED STATES PATENT OFFICE.

GARDINER HALL, JR., OF SOUTH WILLINGTON, CONNECTICUT, AND GEORGE W. AVERELL, OF NEW YORK, N. Y., ASSIGNORS TO GARDINER HALL, JR.

IMPROVEMENT IN SPOOLS FOR THREAD.

Specification forming part of Letters Patent No. 102,257, dated April 26, 1870; reissue No. 7,060, dated April 18, 1876; application filed April 4, 1876.

DIVISION B.

*To all whom it may concern:*

Be it known that GARDINER HALL, Jr., of South Willington, in the county of Tolland and State of Connecticut, and GEORGE W. AVERELL, of the city, county, and State of New York, did invent a new and useful Improvement in Spools for Thread, &c.; and I do hereby declare that the following is a full, clear, and exact description of the same, reference being had to the accompanying drawing, forming part of this specification, in which—

Figure 1:
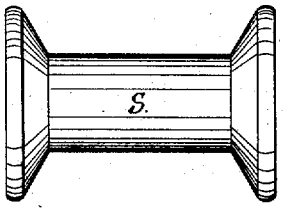
Figure 2:
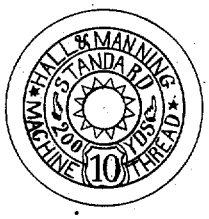

Figure 1 is a side view of a spool, and Fig. 2 an end view, showing the label printed upon the end of the same, directly upon the wood.

The invention consists in a new article of manufacture produced by printing the labels of spool cotton, thread, or silk upon the end of the spool, directly upon the wood, for the purpose hereinafter described.

In the drawing, S represents a wooden spool, perforated axially, and of the kind upon which cotton, thread, or silk is ordinarily wound, with the exception that, instead of having circular paper labels pasted upon the ends over the central perforation, its ends are open, and the label is printed directly upon the fiber of the wood. By printing upon the cross-cut end surface of the wood, the ink sinks into and permeates the longitudinal pores for a considerable depth, thus rendering the label practically ineffaceable, except by cutting away the fiber, which would render the spool useless. One advantage, then, in thus printing the labels is to render the use of one label for any other spool impossible.

It is a common practice with unscrupulous tradesmen to remove the paper labels from high-priced thread or silk spools and affix them to an article of inferior grade and less market-value, or to have fac-similes of labels of high priced thread or silk struck off and pasted upon the ends of spools of inferior grade, the labels of the latter being removed. As the improved labels upon spools of inferior thread or silk could not be removed, the pasting of labels over the ineffaceable print would be a clear swindle, and expose the perpetrator to easy detection, certain conviction, and quick punishment. Hence the invention is practically almost a perfect protection to the public from imposition.

Another advantage is the economy of producing the label. With the expense of printing paper labels, machines for cutting them out, gumming the same, and pasting them upon the spools, as compared with the expense of the improved mode of affixing the label, practical tests demonstrate a saving of just eighty per cent. in favor of the latter, as the only expense with the improved method is the simple operation of the printing.

A still further and important advantage is as follows: All spools which are in common use are perforated, in order to facilitate the manufacture of the spools, the winding of the thread, and the subsequent use of the same upon the sewing-machine spool-stem. When paper labels are employed, they are pasted upon the open ends of the perforation, and when the spool is placed upon the sewing-machine spool-stem the latter bursts, and forces inwardly the paper, which inturned edges of the paper bind the spool with frictional contact to the stem, which interferes seriously with the uniformity of the tension, and causes the machine to be irregular and defective in its operation. It will be seen that the printing of the label directly upon the wood leaves the perforation open and unobstructed at both ends, and entirely obviates the foregoing difficulty.

Having thus described the said invention of Hall and Averell, I claim as new, and desire to secure by Letters Patent—

As an improved article of manufacture, an axially-perforated wooden spool, having the label printed upon the end thereof around the axial perforation, directly upon the fiber of the wood, whereby the axial perforation is left open at both ends, and the spool is free to revolve upon the spool-holder, exempt from the objection of the inturned edges of a paper label, substantially as described.

G. HALL, JR.

Witnesses:

EDWD. W. BYRN,
CHAS. A. PETTIT.